(12) United States Patent
Zait et al.

(10) Patent No.: US 11,778,490 B1
(45) Date of Patent: Oct. 3, 2023

(54) FAILOVER TO A BACKUP POLICY AND CHARGING RULES FUNCTION (PCRF) NODE

(71) Applicant: T-Mobile USA, Inc., Bellevue, WA (US)

(72) Inventors: Hichem Zait, Bellevue, WA (US); Kirti Krishnan, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 59 days.

(21) Appl. No.: 17/161,310

(22) Filed: Jan. 28, 2021

(51) Int. Cl.
*H04W 24/04* (2009.01)
*H04M 15/00* (2006.01)

(52) U.S. Cl.
CPC ........... *H04W 24/04* (2013.01); *H04M 15/66* (2013.01)

(58) Field of Classification Search
CPC .............................. H04W 24/04; H04M 15/66
See application file for complete search history.

(56) References Cited

U.S. PATENT DOCUMENTS

| | | | | |
|---|---|---|---|---|
| 2013/0003529 A1* | 1/2013 | Lopez Nieto | ....... | H04L 12/1403 370/221 |
| 2015/0312101 A1* | 10/2015 | Siedelhofer | ....... | H04M 15/8044 370/328 |
| 2016/0073299 A1* | 3/2016 | Liang | ................... | H04L 12/1407 370/331 |
| 2018/0184466 A1* | 6/2018 | Rahman | ................... | H04W 4/24 |
| 2019/0215729 A1* | 7/2019 | Oyman | ................ | H04L 65/1016 |
| 2020/0076654 A1* | 3/2020 | Sarrigeorgidis | ......... | H04B 1/30 |
| 2020/0112448 A1* | 4/2020 | Yang | ........................ | H04W 4/24 |
| 2022/0070302 A1* | 3/2022 | Lonkar | ................. | H04M 15/66 |

OTHER PUBLICATIONS

Cisco Systems, Inc., "Cisco ASR 5000 Series Intelligent Policy Control Function Administration Guide", available at <<https://www.cisco.com/c/dam/en/us/td/docs/wireless/asr_5000/12_1/OL-23963_IPCF_Admin.pdf>>, Feb. 20, 2013, 86 pages.
Efort, "PCC (Policy and Charging Control) Applications", available at <<http://www.efort.com/media_pdf/APPLICATIONS_PCC_EFORT_ENG.pdf>>, Sep. 25, 2014, 5 pages.
Oracle Corporation, "Oracle Communication Policy Management Feature Guide for Wireless & Fixed Networks (Release 11.5)", White Paper, available at <<https://docs.oracle.com/cd/E55076_01/docs.115/FG005577.pdf>>, Apr. 2015, 43 pages.

* cited by examiner

*Primary Examiner* — Abdullahi Ahmed
(74) *Attorney, Agent, or Firm* — Lee & Hayes, P.C.

(57) ABSTRACT

A telecommunication network associated with a wireless telecommunication provider can be configured to use a backup PCRF when a primary PCRF is detected as exhibiting a failure condition. Instead of the backup PCRF synchronizing with the primary PCRF as in a redundancy mode, the backup PCRF receives a copy of messages sent to the primary PCRF and maintains session information independently from the primary PCRF. In some configurations, a node within the call flow, such as a Diameter Routing Agent (DRA) transmits a copy of the message sent to the primary PCRF to the backup PCRF. In this way, the backup PCRF will not receive data from the primary PCRF that may be corrupted. When a routing agent detects a failure condition of the primary PCRF, the routing agent seamlessly transitions to use of the backup PCRF.

20 Claims, 5 Drawing Sheets

US 11,778,490 B1

FAILOVER TO A BACKUP POLICY AND CHARGING RULES FUNCTION (PCRF) NODE

BACKGROUND

Modern telecommunications networks such as cellular telephone networks can support a variety of sessions, such as voice, video, or messaging. In some configurations, a network, such as a Fourth-generation (4G) cellular network may utilize Voice-over-long-term-evolution (VoLTE) standards for providing voice calls. Generally, VoLTE uses a dedicated bearer to carry voice communication. To create, update, and terminate a dedicated bearer to carry a call for a user, a Policy and Charging Rules Function (PCRF) node is used within the VoLTE call flow. In some cases, however, the PCRF node may fail, or have an error, that causes a call to fail.

BRIEF DESCRIPTION OF THE DRAWINGS

The detailed description is set forth with reference to the accompanying figures.

DETAILED DESCRIPTION

Figure 1:
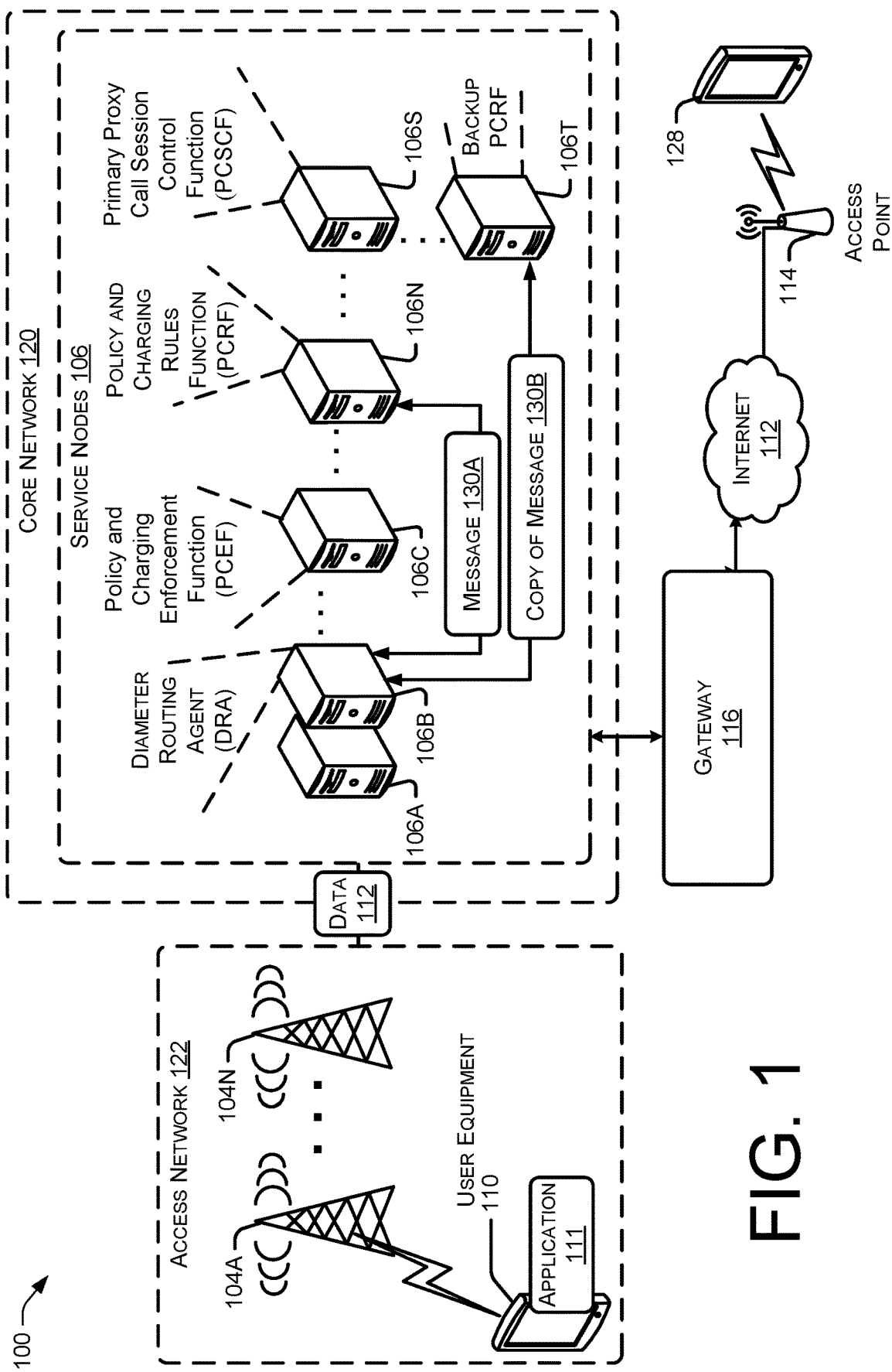
FIG. 1 is a block diagram showing an illustrative environment for failover to a backup Policy and Charging Rules Function (PCRF) node in case of a failure condition with a primary PCRF in a cellular network.

Described herein are techniques and systems for performing a failover to a backup Policy and Charging Rules Function (PCRF) node. Using techniques described herein, a network, such as a telecommunication network associated with a wireless service provider, can be configured to failover to a backup PCRF in case a primary PCRF is experiencing a failure condition. As used herein, a "failure condition" refers to a condition in which a primary PCRF is unavailable to respond, and/or when it is detected that the primary PCRF is experiencing an error.

A PCRF node is part of the Evolved Packet Core (EPC) that supports service data flow detection, policy enforcement and flow-based charging. The PCRF acts as a mediator of network resources for the IP Multimedia Subsystem (IMS) for establishing calls and allocating the requested bandwidth to the call bearer with configured attributes. The PCRF function is part of the larger Policy and Charging Control (PCC) architecture, which may also include the Proxy Call Session Control Function (PCSCF) and the Policy and Charging Enforcement Function (PCEF) that provide access, resource, and quality-of-service (QoS) control. The PCSCF may be the first contact point for the users of the IP Multimedia Subsystem (IMS). The PCSCF functions as a proxy server for the user equipment and is configured to process the Session Initiation Protocol (SIP) signaling traffic to/from the user equipment.

In some configurations, the primary PCRF and/or the backup PCRF, may be deployed in a "redundancy mode" that includes one or more redundant PCRF nodes that are synchronized with each other. For instance, a PCRF may have a first PCRF node located in a first region of the telecommunications network and a second PCRF node located in a second region of the telecommunications network. According to some examples, the second PCRF node is synchronized with the first PCRF node such that the second PCRF node has a same copy of data that is stored by the first PCRF node (e.g., a database of the second PCRF node stores the same values as the database of the first PCRF node).

Using techniques described herein, instead of the backup PCRF node synchronizing with the primary PCRF node as in the redundancy mode discussed above, the backup PCRF receives a copy of the messages sent to the primary PCRF and maintains session information independently from the primary PCRF. In some configurations, a node within the call flow, such as a Diameter Routing Agent (DRA) generates a copy of the message sent to the primary PCRF and then sends the copy of the message to the backup PCRF.

According to some examples, the data stores associated with the primary PCRF are not synchronized with each other. For instance, a database (DB) of the primary PCRF is not synchronized with the DB of the backup PCRF. Stated another way, the backup PCRF obtains a copy of the original message sent to the primary PCRF directly from the DRA node that transmitted the message to the primary PCRF. In this way, the backup PCRF will not receive data from the primary PCRF that may be corrupted. The DRA, or some other device or component, is configured to route messages between nodes of the telecommunications network.

According to some configurations, the primary PCRF and the backup PCRF use different IP paths and are located in different geographical locations/regions. In some examples, the primary PCRF and the backup PCRF are not in direct communication with each other. Since the primary PCRF and the backup PCRF are not synchronized, the performance of the primary PCRF is not impacted by having to synchronize with the backup PCRF.

As briefly discussed above, messages received by the DRA are provided to the primary PCRF and a copy of the messages directed to the DRA are provided to the backup PCRF. When the DRA detects a failure condition of the primary PCRF, the DRA seamlessly transitions to use of the backup PCRF. As such, even in the case of failure of both the first primary PCRF node and the second primary PCRF node, the Gx and Rx bindings will be performed using the backup PCRF. Further, the primary PCRF may be updated/restored without impacting the backup PCRF.

Many different failure scenarios may be handled using the techniques and systems described herein. For example, a failure of the DB used to store the PCRF session Data, or session record corruption within the primary PCRF does not affect the DB or other data of the backup PCRF. Natural disasters or IP failures causing the primary PCRF (e.g., the first primary PCRF and the second redundant PCRF) to be unavailable. Other failure scenarios include but are not limited to a software bug or accidental configuration deletion, a system crash, system errors on the first primary PCRF and the second redundant PCRF, and the like.

When the primary PCRF comes back into service, the DRA may return to utilizing the primary PCRF. Techniques described herein may be utilized with various networks. For example, the networks may include LTE networks (e.g., Mid-Band Frequencies: LTE 2.1 GHz+LTE 1.9 GHz), 5G networks, and/or some other frequency(s) (e.g., 2.5 GHz). More details are provided below with reference to FIG. 15.

FIG. 1 is a block diagram showing an illustrative environment 100 for failover to a backup PCRF node 106T in case of a failure condition with a primary PCRF 106N in a cellular network. The environment 100 may include a core network 120 and an access network 122 that is associated with a wireless service provider. The environment 100 is illustrated in simplified form and may include many more components.

The environment 100 may include nodes 104, such as nodes 104A-104N, which may also be referred to herein as "cells". The nodes 104 may be wireless nodes or wired nodes that are coupled to core network 120 and/or some other network. The environment 100 may also include one or more access points 114, one or more gateways 116, and one or more service nodes 106. A node, such as a node 104 may handle traffic and signals between electronic devices, such as the user equipment 110, 128, and a core network 120. For example, a node 104 may perform the transcoding of speech channels, allocation of radio channels to electronic devices, paging, transmission and reception of voice and data, as well as other functions. A node 104 may include several base transceiver stations (BTS), each BTS may include a transceiver, antenna, and additional network switch and control equipment that provide a network cell for facilitating wireless communication between UE computing devices and the core network 120. In some examples, the nodes 104 include a gNodeB and/or an eNodeB.

The core network 120 may be responsible for performing functionality relating to failing over to a backup PCRF 106T, routing voice communication to other networks, as well as routing data communication to external packet switched networks, such as the Internet 112. For example, the one or more service nodes 106A-106T may be a Gateway GPRS Support Node (GGSN) or another equivalent node. According to some configurations, the one or more service nodes also include a primary PCRF node 106N and a backup PCRF node 106T that can be utilized to enforce policy rules of the network and make bindings for communications between endpoints. The PCRF nodes can be configured to automatically make policy decisions for each subscriber (e.g., each user equipment (UE)) active on the network. For example, the PCRF may be utilized to allocate bandwidth of the network as well as provide different levels of service to different computing devices on the network. As illustrated the nodes 106 include a DRA node 106B, a PCEF node 106C, and a PCRF node 106S.

The user equipment 110 are computing devices that can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data using a cellular access network 122, and/or over a Wi-Fi network, or some other type of network. In some instances, the UE 110 computing devices can be configured to send and receive data using any wired or wireless protocols. Additional examples of the UE 110 include, but are not limited to, smart devices such as televisions, music players, vehicles (e.g., cars, trucks, buses, . . . ), Internet of Things (IoT) computing devices, or any other electronic appliances or computing devices that can generate, request, receive, transmit, or exchange voice, video, and/or digital data over a network. The UE 110 can further be configured to establish or receive a communication session, such as a VoLTE, VoNR, VoWifi, or other voice call, a video call, or another sort of communication. Establishment of such sessions can involve communication clients and Session Initiation Protocol (SIP) clients to communicate with the telecommunications network.

In some configurations, one or more of the service nodes 106 may be configured as one or more application servers that provide support for one more applications, such as application 111 utilized by one or more user equipment 110 computing devices. Some example applications include, but are not limited to browser applications, messaging applications, voice applications (e.g., Voice over Internet Protocol "VoIP" applications), video applications, game applications, and the like.

While the service nodes 106 are illustrated within the core network 120, one or more other computing devices may be located outside of the core network 120. For example, an application server, or some other server or device, may be connected to the core network 120 via one or more external packet switched networks, such as the Internet. In some examples, one or more computing devices outside of the core network 120 may be utilized to perform processing related to transmitting application data using different quality of service (QoS) specifications.

According to some configurations, a client application, such as application 111, on the UE 110 may establish data communication with the network 120 through a data connection to the node 104A. The node 104A may route a communication wired/wirelessly from the UE 110 through the access network 122 for communication to the core network 120. Similarly, node 104N may route a communication wired/wirelessly from the UE 110 through the access network 122 for communication within the access network 122 and/or to the core network 120.

When a communication request arrives at the network 120, one or more of the service nodes 106 may determine the identity of the originating computing device for the communication (e.g., using a telephone number, IMEI, IMSI, IP address) as well as the identity of the computing devices to send the communication. According to some configurations, a UE 128 may connect to the service nodes 106, or some other component such as an application server, via the Internet 112. In such instances, the UE 128 may connect to the Internet 112 via Wi-Fi access point 114. Accordingly, data traffic from the UE 128 may be routed to the service nodes 106 by the gateway 116 of the network 120.

In some configurations, a wireless service provider may utilize alternative access vendor (AAV) networks, for example, which utilize Ethernet networks to provide a wired connection, such as wired connection, to provide at least a portion of backhaul for broadband cellular services, such as 5G networks. In other examples, the wireless service provider may deploy its own wired connections.

In general, a node 104 can be implemented as a variety of technologies to provide wired and/or wireless access to the network, as discussed herein. In some instances, the nodes 104 can include a 3GPP RAN, such a GSM/EDGE RAN (GERAN), a Universal Terrestrial RAN (UTRAN), an evolved UTRAN (E-UTRAN), or a New Radio (5G) RAN, or alternatively, a "non-3GPP" RAN, such as a Wi-Fi RAN, or another type of wireless local area network (WLAN) that is based on the IEEE 802.11 standards. Further, the nodes 104 can include any number and type of transceivers and/or base stations representing any number and type of macrocells, microcells, picocells, or femtocells, for example, with any type or amount of overlapping coverage or mutually exclusive coverage. The nodes 104 can be associated with access network 122.

As shown in FIG. 1, some nodes 104 have no physical (i.e., "wired") data connection to network. In other words, some of the nodes, such as node 104A, are not connected to the core network 120 using fiber cabling, copper cabling, and/or some other type of wired connection. The nodes 104 that do not have a wired connection may be connected to one or more wired nodes 104, such as node 104N, that does have a wired connection to the core network 120. A wired node utilizes fiber, or other wired data connections, to connect to the core network 120. As shown, wired node 104N connects to the core network via an Ethernet connection via a fiber optic, coaxial, or other high speed wired data connection. A wired node 104, such as node 104N, could also be connected by a coaxial, T1, T3, or other suitable high-speed connection to the core network 120. In some configurations, mesh networking technology can be used to connect different nodes 104 within the access network 122. Geographic Information Services (GIS) and other terrain and location information systems can be used to determine nodes to provide a connection between one or more non-wired nodes and a network 120.

In some instances, the environment 100 can further include one or more servers, including service nodes 106, to facilitate communications by and between the various devices in the environment 100 and perform operations relating to failing over to a backup PCRF node 106T in case of a failure condition with the primary PCRF 106N in a cellular network. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long-Term Evolution (LTE), including LTE Advanced, Evolved High-Speed Packet Access (HSPA+) are examples of 4G, and 5G NR is an example of 5G telecommunications technologies. Thus, the environment 100 may implement GSM, UMTS, LTE/LTE Advanced, and/or 5G NR telecommunications technologies.

The environment 100 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UE 110, the nodes 104, and one or more endpoints of the network (e.g., service nodes 106, websites, etc.). While FIG. 1 illustrates an example environment 100, it is understood in the context of this document, that the techniques discussed herein may also be implemented in other networking technologies.

The access network 122 can be any sort of access network, such as a GSM or UMTS network. The access network 122 can include any aspects of one or more of second, third, fourth generation, and fifth generation (2G, 3G, 4G, 4GLTE, and 5G) cellular-wireless access technologies. The access network 122 can also be referred to as a universal terrestrial radio network (UTRAN) or a GSM EDGE radio access network (GERAN) and can include one or base stations, as well as a radio network controller (RNC).

In the example illustrated in FIG. 1, the UE 110 connects to node 104A to transmit data 112. The application data 112 and other data may be transmitted across different networks. For example, the networks may be LTE networks (e.g., Mid-Band Frequencies: LTE 2.1 GHz+LTE 1.9 GHz), 5G networks, and/or some other frequency(s) (e.g., 2.5 GHz). More details are provided below with regard to FIGS. 2-4.

As briefly discussed above, instead of the backup PCRF 106T synchronizing with the primary PCRF 106N as in the redundancy mode discussed above, the backup PCRF 106T receives a copy of the message 130B sent to the primary PCRF 106N and maintains session information independently from the primary PCRF. In some configurations, a node within the call flow, such as the DRA receives the message 130A, generates a copy of the message, and transmits the copy of the message 130B to the backup PCRF 1062. Stated another way, the backup PCRF 106T obtains a copy of message 130B sent to the primary PCRF 106N directly from the DRA node 106B that transmitted the message 130A to the primary PCRF 106N. In this way, the backup PCRF 106T will not receive data from the primary PCRF 106N that may be corrupted. As briefly discussed, the DRA 106B, or some other device or component, is configured to route messages between nodes of the telecommunications network.

When the DRA 106B, or some other device or component, detects a failure condition of the primary PCRF 106N, the DRA 106B seamlessly transitions to use of the backup PCRF 106T. As such, even in the case of failure of the primary PCRF node 106N (which may have one or more redundant synchronized nodes), the Gx and Rx binding will be performed using the backup PCRF 106T. Further, the primary PCRF 106N may be updated/restored without impacting the backup PCRF. When the primary PCRF 106N exits the failure condition and returns to service, the DRA 106B may return to utilizing the primary PCRF 106N. More details are provided below with regard to FIGS. 2-5.

Figure 2:
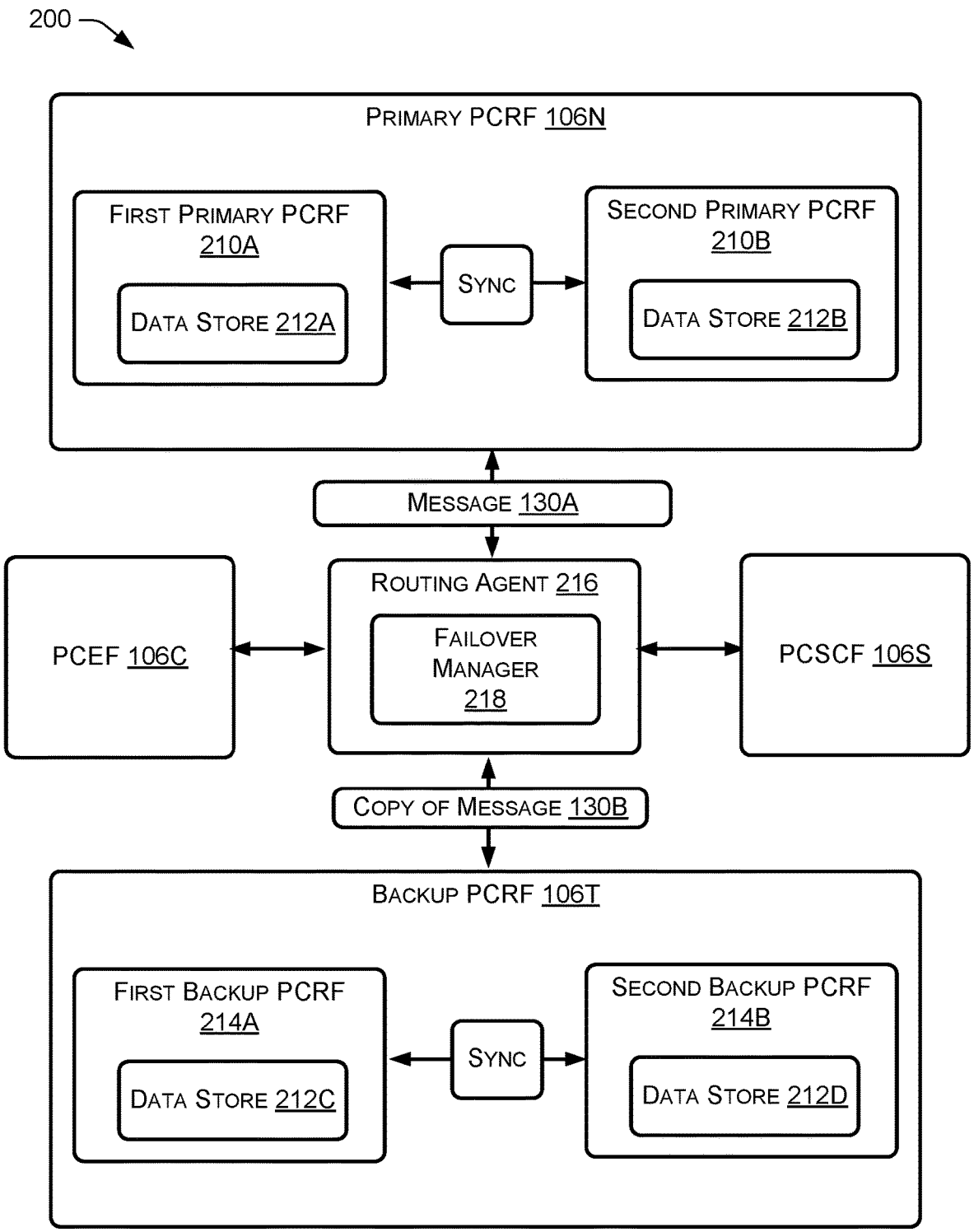
FIG. 2 is a block diagram showing an illustrative environment for using a routing agent to communicate with a primary PCRF and a backup PCRF in a cellular network.

FIG. 2 is a block diagram showing an illustrative environment for using a routing agent to communicate with a primary PCRF and a backup PCRF in a cellular network. FIG. 2 is similar to FIG. 1 but includes more details on the communication between the routing agent 216A and the primary PCRF 106N and the backup PCRF 106T. According to some configurations, the primary PCRF 106N and the backup PCRF 106T are not in direct communication with each other, use different IP paths, and are located in different geographical locations/regions. The environment 200 is illustrated in simplified form and may include many more components.

As illustrated, environment 200 shows the primary PCRF 106N and a backup PCRF 106T configured in a redundancy mode. The primary PCRF 106N includes a first primary PCRF 210A that includes a data store 212A in a first location/region and a second primary PCRF 210B that includes a data store 212B in a second location/region. The backup PCRF 106T includes a first backup PCRF 214A that includes a data store 212C in a first location/region and a second backup PCRF 214B that includes a data store 212D in a second location/region. While one redundant node is shown in the primary PCRF 106N and the backup PCRF 106T, more redundant nodes may be utilized. In some examples, the primary PCRF 106N and/or the backup PCRF 106T node may not be deployed in a redundancy mode. In the example illustrated in FIG. 2, the first primary PCRF 210A is synchronized with the second primary PCRF 210B such that the second primary PCRF node 210B has a same copy of data that is stored by the first primary PCRF node 210A (e.g., a data store 212B of the second primary PCRF node 210B stores the same values as the data store 212A of the first primary PCRF node 210A. Similarly, the first backup PCRF 214A is synchronized with the second backup PCRF 214B. As discussed above, however, the backup PCRF 106T is not synchronized with the primary PCRF 106N.

Instead, the backup PCRF 106T receives a copy of message 130B from routing agent 216 and the primary PCRF receives the original message 130A. The backup PCRF 106T acts independently from the primary PCRF 106N and maintains session information independently from the primary PCRF 106N. In some configurations, the failover manager 218 is configured to perform operations relating to communicating with the backup PCRF 106T and determining when the primary PCRF 106N is in a failure condition.

As briefly discussed above, messages received by the routing agent 216 are provided to the primary PCRF and the routing agent 216 generates a copy of message 130B by duplicating message 130A. When the failover manager 218 detects a failure condition of the primary PCRF 106N, the failover manager 218 seamlessly transitions to use of the backup PCRF 106T. As such, even in the case of failure of both the first primary PCRF node 210A and the second primary PCRF node 210B, the Gx and Rx binding may be performed using the backup PCRF 106T Further, the primary PCRF 106N may be taken offline and updated/restored without impacting the backup PCRF.

Many different failure scenarios may be detected by the failover manager 218, or some other device or component. For example, a failure of the data store 212A and/or data store 212B used to store the PCRF session Data, or session record corruption within the primary PCRF 106N does not affect the data stored by the backup PCRF 106T. Further, natural disasters or IP failures causing the primary PCRF 106N that may include the first primary PCRF 210A and the second primary PCRF 210B to be unavailable. Other failure scenarios that may be detected by the failover manager 218 include but are not limited to a software bug or accidental configuration deletion, a system crash, system errors of the primary PCRF 106N, and the like.

In some configurations, send Gx messages received by the routing agent 216 from the PCEF 106C directed to the primary PCRF 106F are copied by the routing agent 216 and are transmitted to the backup PCRF 106T. When the primary PCRF is operating and is not in a failure condition, the routing agent 216 receives answers from both the primary PCRF 106N and the backup PCRF 106T. In some examples, the failover manager 218 of the routing agent 216 ignores the answer received from the backup PCRF 106T since the primary PCRF 106N is operating normally and replies back to the PCEF 106C with the answer received from the primary PCRF 106N.

Similarly, Rx messages are sent by the routing agent 216 to the primary PCRF 106N when the primary PCRF 106N is operating normally. When it is determined by the failover manager 218 that the primary PCRF 106N is in a failure condition, the Gx request is sent to the backup PCRF 106T and the routing agent 216 sends the answer received from the backup PCRF 106T to the PCEF 106C. In some examples, when the routing agent 216 receives the Rx request from the PCSCF 106S, the routing agent 216 attempts to send the RX request to the primary PCRF 106N and to the backup PCRF 106T without returning an error back to PCSCF 106S that indicates a failure of the primary PCRF 106N. Since the backup PCRF 106T has a copy of the session through the message copy mechanism described herein, the backup PCRF 106T binds the Gx and Rx sessions and establishes the dedicated bearer. When the primary PCRF comes back into service, the DRA may return to utilizing the primary PCRF.

Figure 3:
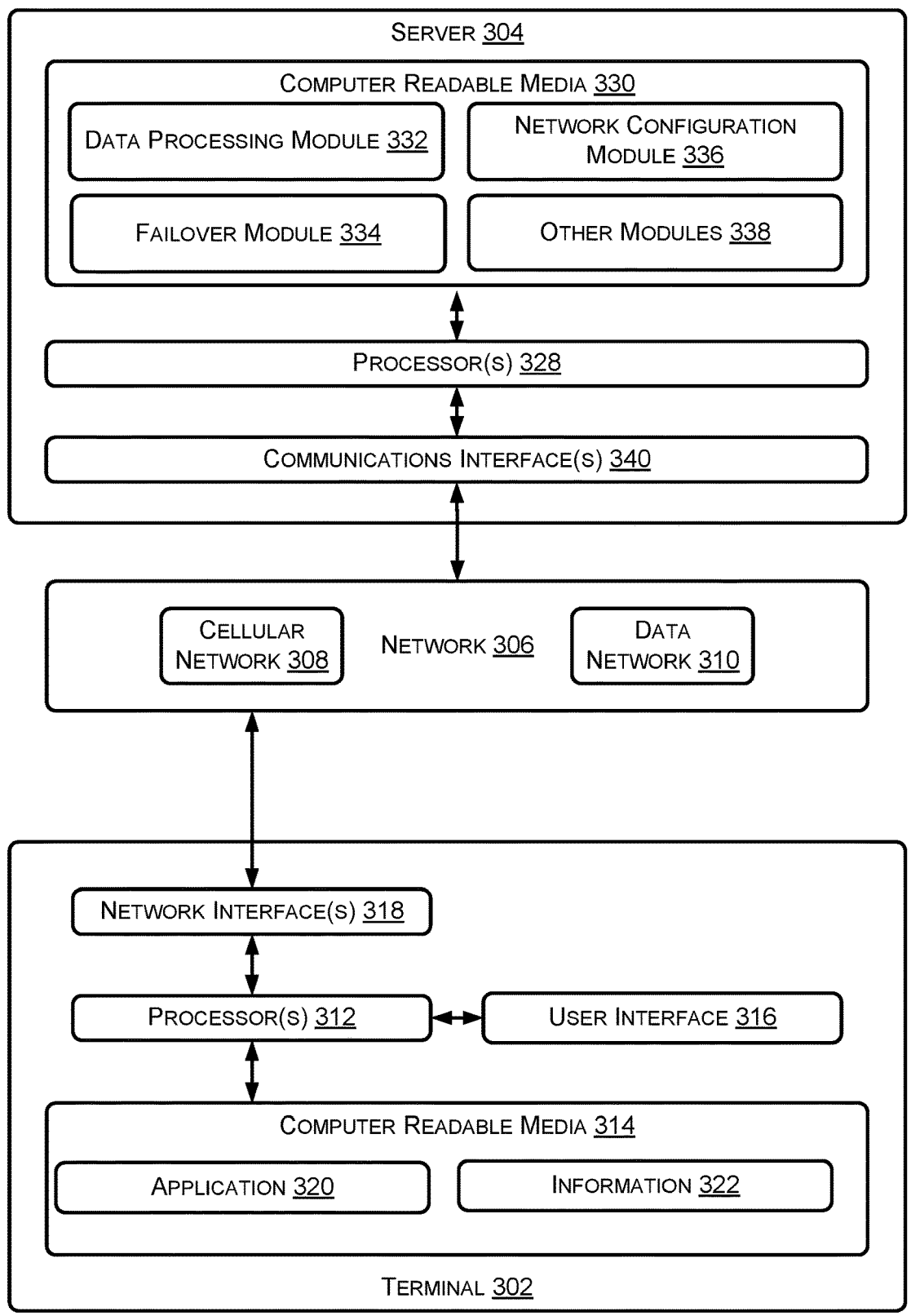
FIG. 3 is a block diagram illustrating a system that includes one or more modules includes one or more modules for using a backup PCRF node as a failover in case of a failure with a primary PCRF in a cellular network.

FIG. 3 is a block diagram illustrating a system 300 that includes one or more modules for using a backup PCRF node 106T as a failover in case of a failure with a primary PCRF 106N in a cellular network. The system 300 includes a terminal 302, which can represent a User Endpoint (UE) 110, or another computing device, coupled to a server 304, via a network 306. The server 304 can represent a computing device, such as one or more of the servers within the network 120 and/or access network 122, and/or some other computing device. The network 306 can represent network 120 and/or access network 122, or some other network.

The network 306 can include one or more networks, such as a cellular network 308 and a data network 310. The network 306 can include one or more core network(s) connected to terminal(s) via one or more access network(s). Example access networks include LTE, WIFI, GSM Enhanced Data Rates for GSM Evolution (EDGE) Radio Access Network (GERAN), UTRAN, and other cellular access networks. Message transmission, reception, fallback, and deduplication as described herein can be performed, e.g., via 3G, 4G, 5G, WIFI, or other networks.

The cellular network 308 can provide wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 304 and terminals such as the terminal 302 can additionally or alternatively be performed using other technologies, such as wired (Plain Old Telephone Service, POTS, or PSTN lines), optical (e.g., Synchronous Optical NETwork, SONET) technologies, and the like.

The data network 310 can include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In some examples, the server 304 includes or is communicatively connected with an IWF or other device bridging networks, e.g., LTE, 3G, and POTS networks. In some examples, the server 304 can bridge SS7 traffic from the PSTN into the network 306, e.g., permitting PSTN customers to place calls to cellular customers and vice versa.

In some examples, the cellular network 308 and the data network 310 can carry voice or data. For example, the data network 310 can carry voice traffic using VoIP or other technologies as well as data traffic, or the cellular network 308 can carry data packets using HSPA, LTE, or other technologies as well as voice traffic. Some cellular networks 308 carry both data and voice in a PS format. For example, many LTE networks carry voice traffic in data packets according to the VoLTE standard. Various configurations provide origination and termination of, e.g., carrier-grade voice calls on, e.g., networks 306 using CS transports or mixed VoLTE/3G transports, or on terminals 302 including OEM handsets and non-OEM handsets.

The terminal 302 can be or include a wireless phone, a wired phone, a tablet computer, a laptop computer, a wristwatch, an IoT device, a vehicle, a computing device, or other type of terminal. The terminal 302 can include one or more processors 312, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 314, such as memory (e.g., random access memory (RAM), solid state drives (SSDs), or the like), disk drives (e.g., platter-based hard drives), another type of computer-readable media, or any combination thereof. The CRM or other memory of terminal 302 can hold a datastore.

The terminal 302 can further include a user interface (UI) 316, e.g., including an electronic display device, a speaker, a vibration unit, a touchscreen, or other devices for presenting information to a user and receiving commands from the user. The terminal 302 can further include one or more network interface(s) 318 configured to selectively communicate (wired or wirelessly) via the network 306, e.g., via an access network 122.

The CRM 314 can be used to store data and to store instructions that are executable by the processors 312 to perform various functions as described herein. The CRM 314 can store various types of instructions and data, such as an operating system, device drivers, etc. The processor-executable instructions can be executed by the processors 312 to perform the various functions described herein.

The CRM 314 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 312. Tangible computer-readable media can include volatile and nonvolatile, removable and non-removable media implemented in any method or technology for storage of information, such as computer readable instructions, data structures, program modules, or other data.

The CRM 314 can include processor-executable instructions of an application 320. The CRM 314 can store information 322 identifying the terminal 302. The information 322 can include, e.g., an IMEI, an IMSI identifying the subscriber using terminal 302, or other information discussed above. The CRM 314 can additionally or alternatively store credentials (omitted for brevity) used for access, e.g., to IMS or RCS services.

The server 304 can include one or more processors 328 and one or more CRM 330. The CRM 330 can be used to store processor-executable instructions of a data processing module 332, a failover module 334 which may be failover manager 218, a network configuration module 336, as well as one or more other modules 338. The processor-executable instructions can be executed by the one or more processors 228 to perform various functions described herein.

In some examples, server 304 can communicate with (e.g., is communicatively connectable with) terminal 302 or other devices via one or more communications interface(s) 340, e.g., network transceivers for wired or wireless networks, or memory interfaces. Example communications interface(s) 340 can include ETHERNET or FIBRE CHANNEL transceivers, WIFI radios, or DDR memory-bus controllers (e.g., for DMA transfers to a network card installed in a physical server 304).

In some examples, processor 312 and, if required, CRM 314, are referred to for brevity herein as a "control unit." For example, a control unit can include a CPU or DSP and instructions executable by that CPU or DSP to cause that CPU or DSP to perform functions described herein. Additionally, or alternatively, a control unit can include an ASIC, FPGA, or other logic device(s) wired (physically or via blown fuses or logic-cell configuration data) to perform functions described herein. Other examples of control units can include processor 328 and, if required, CRM 330.

Figure 4:
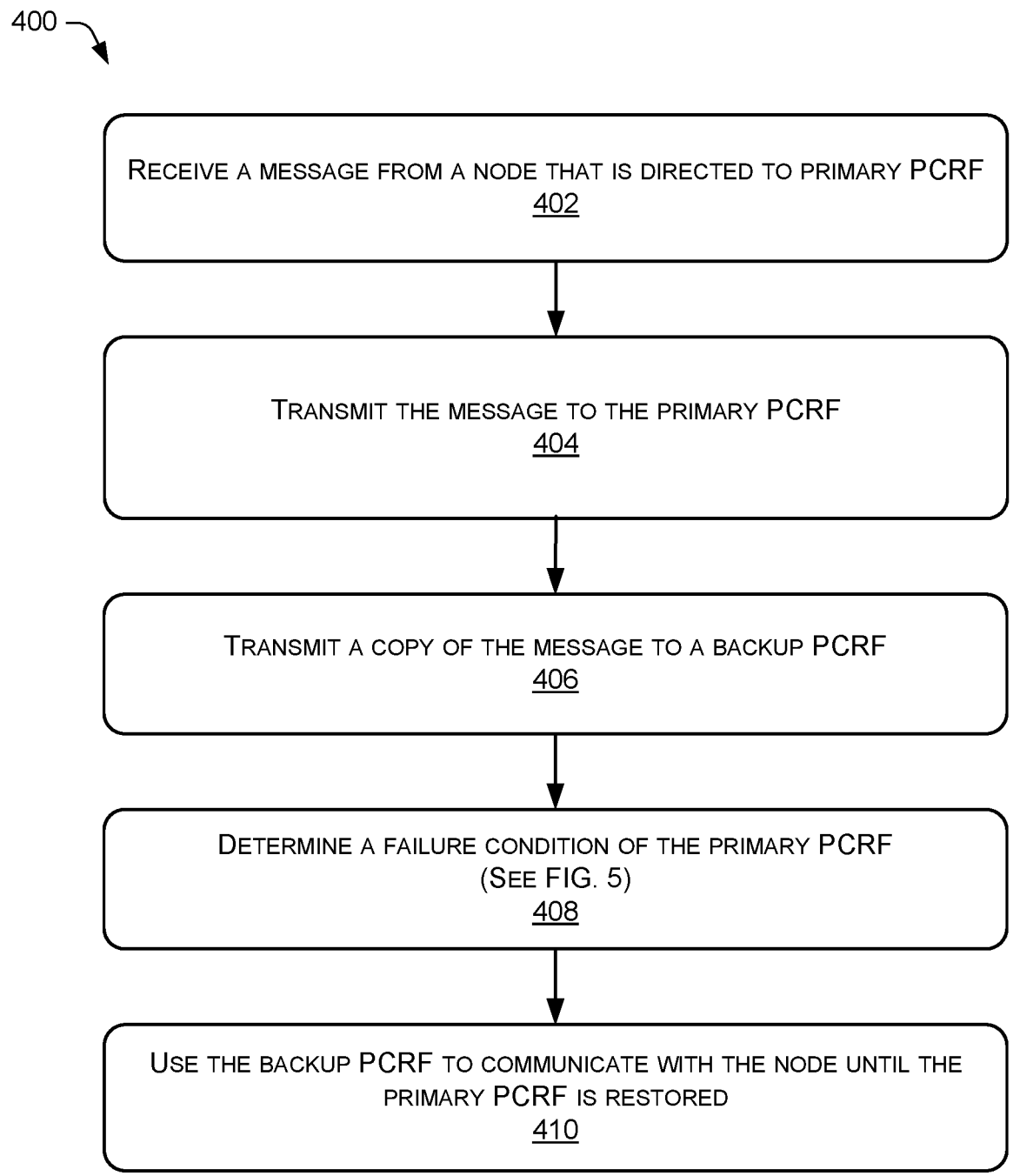
FIG. 4 is a flow diagram of an example process that includes failing over to a backup PCRF node in case of a failure with a primary PCRF in a cellular network according to some implementations.
Figure 5:
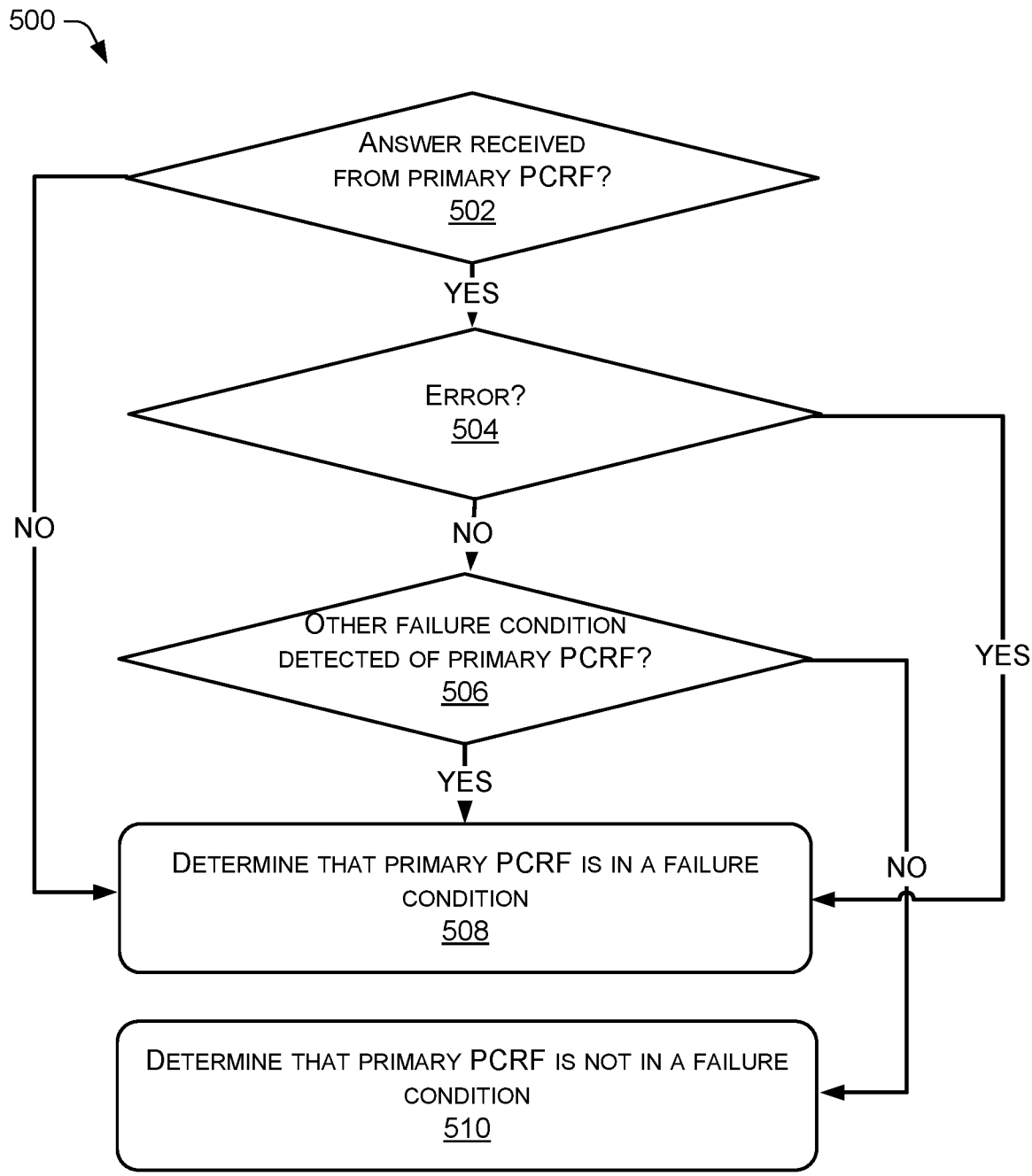
FIG. 5 is a flow diagram of an example process that includes determining whether a primary PCRF is experiencing a failure condition according to some implementations.

FIG. 4 and FIG. 5 illustrate example processes. Each of these processes are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process for failing over to a backup PCRF node in case of a failure with a primary PCRF in a cellular network. The process includes, at 402, receiving a message from a node that is directed to the primary PCRF 106N. As discussed above, in some configurations, the DRA 106B may receive a message from a PCEF node 106C, a PCSCF node 106S, and/or some other node that is directed to the primary PCRF 106N.

At 404, the message is sent to the primary PCRF 106N. As discussed above, the DRA 106 may transmit the message 130A to the primary PCRF 106N.

At 406, a copy of the message 130B is transmitted to the backup PCRF 106S. As discussed above, the DRA 106B may duplicate message 130A to generate the copy of the message 130B that is transmitted to the backup PCRF 106T.

At 408, a failure condition of the primary PCRF 106N is determined. As discussed above, a failover manager 218, may identify that the primary PCRF 106N is experiencing a failure condition. The failure condition may be a variety of different conditions that indicate that the primary PCRF 106N is not able to perform operations for at least some period of time. For instance, the PCRF 106N may be unreachable over a network, the PCRF 106N may be offline, the PCRF 106N may be upgrading, rebooting, or performing some other operation, the PCRF 106N may provide an error condition to the failover manager 218, and the like. See FIG. 5 for more details.

At 410, the backup PCRF 106T is used by the DRA 106B until the primary PCRF 106N is no longer in a failure condition. As discussed above, the backup PCRF node 106T may be utilized to communicate messages between nodes in the network. When the primary PCRF 106N is no longer in a failure condition, the DRA 106B may switch back to using the primary PCRF 106N instead of the backup PCRF 106T.

FIG. 5 illustrates an example process for determining whether a primary PCRF 106N is experiencing a failure condition. The process includes, at 502, a determination as to whether an answer has been received from the primary PCRF 106N that is expected in response to sending message 130A. When an answer has not been received within some predetermined period of time, the process 500 moves to 508. When an answer has been received by the DRA 106B, the process 500 moves to 504.

At 504, a determination as to whether an error has been received from the primary PCRF 106N. For example, the primary PCRF 106N may send an error message in response to internally detecting an error of the operation of the primary PCRF 106N. When an error has not been received within some predetermined period of time, the process 500 moves to 506. When an error has been received by the DRA 106B, the process 500 moves to 508.

At 506, a determination as to whether some other failure condition is detected involving the primary PCRF 106N. For example, the primary PCRF 106N may be unreachable, a network connection to the primary PCRF 106N may be down, and the like. When some other failure condition has not been detected, the process 500 moves to 510. When some other failure condition has been detected, the process 500 moves to 508.

At 508, a determination is made that the primary PCRF 106N is in a failure condition. As discussed above, the failover manager 218, or some other device or component may be utilized to determine that the primary PCRF 106N is in a failure condition.

At 510, a determination is made that the primary PCRF 106N is not in a failure condition. As discussed above, the failover manager 218, or some other device or component may be utilized to determine that the primary PCRF 106N is not in a failure condition.

Although the subject matter has been described in language specific to structural features and/or methodological acts, it is to be understood that the subject matter described in this disclosure is not necessarily limited to any of the specific features or acts described. Rather, the specific features and acts are disclosed as examples and embodiments of the present disclosure.

What is claimed is:

1. A system comprising:
   one or more processors;
   a memory; and
   one or more components stored in the memory and executable by the one or more processors to perform operations comprising:
   receiving a message from a node in a cellular network that follows a Voice-over-long-term-evolution (VoLTE) standard;
   in response to receiving the message:
   transmitting the message to a primary Policy and Charging Rules Function (PCRF) node at a first location within the cellular network; and
   transmitting a copy of the message to a backup PCRF node at a second location within the cellular network, wherein the backup PCRF node maintains information independently from the primary PCRF node;
   after transmitting the message and the copy of the message, determining a failure condition of the primary PCRF node; and
   transmitting an answer, received from the backup PCRF node, to the node.

2. The system of claim 1, wherein the node is configured to perform operations associated with one or more of a Policy and Charging Enforcement Function (PCEF) function and a Proxy Call Session Control Function (PCSCF) function.

3. The system of claim 1, wherein determining the failure condition of the primary PCRF node comprises one or more of determining non-receipt of a primary answer from the primary PCRF node, determining that data associated with the primary PCRF is corrupted, and determining that an error is received from the primary PCRF node.

4. The system of claim 1, the operations further comprising transitioning to use the backup PCRF for a period of time that the primary PCRF is in the failure condition.

5. The system of claim 1, wherein the primary PCRF node includes a second primary PCRF node that is redundant to the primary PCRF node and wherein the operations further comprise synchronizing the primary PCRF node with the second primary PCRF node.

6. The system of claim 1, wherein the backup PCRF maintains session information independently of the primary PCRF and wherein the primary PCRF uses a first Internet Protocol (IP) path and the backup PCRF uses a second IP path.

7. A computer-implemented method performed by one or more processors configured with specific instructions, the computer-implemented method comprising:
   receiving, at a routing agent, a message from a node in a cellular network;
   in response to receiving the message:
   transmitting, by the routing agent, the message to a primary Policy and Charging Rules Function (PCRF) node at a first location within the cellular network; and
   transmitting, by the routing agent, a copy of the message to a backup PCRF node at a second location within the cellular network, wherein the backup PCRF node maintains information independently from the primary PCRF node;
   after transmitting the message and the copy of the message, determining a failure condition of the primary PCRF node; and
   transmitting, by the routing agent, an answer received from the backup PCRF node to the node.

8. The computer-implemented method of claim 7, wherein the node is configured to perform operations associated with one or more of a Policy and Charging Enforcement Function (PCEF) function and a Proxy Call Session Control Function (PCSCF) function.

9. The computer-implemented method of claim 7, wherein the message is associated with a Voice-over-long-term-evolution (VoLTE) specification.

10. The computer-implemented method of claim 7, wherein determining the failure condition of the primary PCRF node comprises one or more of determining non-receipt of a primary answer from the primary PCRF node, determining that data associated with the primary PCRF is corrupted, and determining that an error is received from the primary PCRF node.

11. The computer-implemented method of claim 7, further comprising transitioning to use the backup PCRF for a period of time that the primary PCRF is in the failure condition.

12. The computer-implemented method of claim 7, wherein the primary PCRF node includes a second primary PCRF node that is redundant to the primary PCRF node and further comprising synchronizing the primary PCRF node with the second primary PCRF node.

13. The computer-implemented method of claim 7, wherein the backup PCRF maintains session information independently of the primary PCRF and wherein the primary PCRF uses a first Internet Protocol (IP) path and the backup PCRF uses a second IP path.

14. A non-transitory computer-readable media storing computer-executable instructions that, when executed, cause one or more processors of a computing device to perform acts comprising:

receiving, at a routing agent, a message from a node in a cellular network;

in response to receiving the message:

transmitting, by the routing agent, the message to a primary Policy and Charging Rules Function (PCRF) node at a first location within the cellular network; and transmitting, by the routing agent, a copy of the message to a backup PCRF node at a second location within the cellular network, wherein the backup PCRF node maintains information independently from the primary PCRF node;

after transmitting the message and the copy of the message, determining a failure condition of the primary PCRF node; and transmitting, by the routing agent, an answer received from the backup PCRF node to the node.

15. The non-transitory computer-readable media of claim 14, wherein the node is configured to perform operations associated with one or more of a Policy and Charging Enforcement Function (PCEF) function and a Proxy Call Session Control Function (PCSCF) function.

16. The non-transitory computer-readable media of claim 14, wherein the message is associated with a Voice-over-long-term-evolution (VoLTE) specification.

17. The non-transitory computer-readable media of claim 14, wherein determining the failure condition of the primary PCRF node comprises one or more of determining non-receipt of a primary answer from the primary PCRF node, determining that data associated with the primary PCRF is corrupted, and determining that an error is received from the primary PCRF node.

18. The non-transitory computer-readable media of claim 14, wherein the acts further comprising transitioning to use the backup PCRF for a period of time that the primary PCRF is in the failure condition.

19. The non-transitory computer-readable media of claim 14, wherein the primary PCRF node includes a second primary PCRF node that is redundant to the primary PCRF node and wherein the acts further comprise synchronizing the primary PCRF node with the second primary PCRF node.

20. The non-transitory computer-readable media of claim 14, wherein the backup PCRF maintains session information independently of the primary PCRF and wherein the primary PCRF uses a first Internet Protocol (IP) path and the backup PCRF uses a second IP path.

\* \* \* \* \*